US011852366B2

(12) United States Patent
Ogawa et al.

(10) Patent No.: US 11,852,366 B2
(45) Date of Patent: Dec. 26, 2023

(54) SYSTEM AND METHOD TO CONTROL AN AIR CONDITIONING SYSTEM USING A VOICE COMMAND

(71) Applicant: DAIKIN INDUSTRIES, LTD., Osaka (JP)

(72) Inventors: Kouhei Ogawa, Osaka (JP); Kiyoyuki Suou, Osaka (JP); Mayuko Nakayama, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 204 days.

(21) Appl. No.: 17/424,827

(22) PCT Filed: Jan. 24, 2020

(86) PCT No.: PCT/JP2020/002575
§ 371 (c)(1),
(2) Date: Jul. 21, 2021

(87) PCT Pub. No.: WO2020/158615
PCT Pub. Date: Aug. 6, 2020

(65) Prior Publication Data
US 2022/0026090 A1     Jan. 27, 2022

(30) Foreign Application Priority Data
Jan. 29, 2019   (JP) .................................. 2019-012702

(51) Int. Cl.
*F24F 11/50*     (2018.01)
*F24F 11/65*     (2018.01)
(Continued)

(52) U.S. Cl.
CPC .............. *F24F 11/50* (2018.01); *F24F 11/56* (2018.01); *F24F 11/65* (2018.01); *G05B 19/042* (2013.01);
(Continued)

(58) Field of Classification Search
CPC .. F24F 11/50; F24F 11/56; F24F 11/65; F24F 2110/10; F24F 2110/20; F24F 11/64;
(Continued)

(56) References Cited

U.S. PATENT DOCUMENTS

2006/0059928 A1*  3/2006  Fujiyoshi ................. F24F 11/30
                                                             62/176.6
2016/0373269 A1   12/2016  Okubo et al.
(Continued)

FOREIGN PATENT DOCUMENTS

CN   104214890 A  * 12/2014
JP   2002-89942 A    3/2002
(Continued)

OTHER PUBLICATIONS

European Search Report of corresponding EP Application No. 20 74 8294.4 dated Feb. 17, 2022.
(Continued)

*Primary Examiner* — Alicia M. Choi
(74) *Attorney, Agent, or Firm* — Global IP Counselors, LLP (57) ABSTRACT

An air conditioning system includes a first air conditioning device installed in a predetermined space, and a second air conditioning device installed in the predetermined space. The first air conditioning device is configured to change an air state in the predetermined space in accordance with a direction inputted by voice to an input-output device that is voice operable. The second air conditioning device is configured to change the air state in the predetermined space in accordance with the direction inputted by voice to the input-output device. Upon acquisition of direction information indicating the direction not specifying a device, the air conditioning system performs processing in response to the direction with use of an air conditioning device selected
(Continued)

from the first air conditioning device and the second air conditioning device in accordance with a predetermined condition set in advance.

18 Claims, 4 Drawing Sheets

(51) Int. Cl.
    *F24F 11/56*     (2018.01)
    *G05B 19/042*     (2006.01)
    *F24F 110/20*     (2018.01)
    *F24F 110/10*     (2018.01)

(52) U.S. Cl.
    CPC ....... *F24F 2110/10* (2018.01); *F24F 2110/20* (2018.01); *G05B 2219/2614* (2013.01)

(58) Field of Classification Search
    CPC .................. F24F 11/30; G05B 19/042; G05B 2219/2614; G08C 17/02; G08C 2201/31; G06F 3/167; G10L 15/22; B60R 16/0373
    See application file for complete search history.

(56) References Cited

U.S. PATENT DOCUMENTS

2016/0378424 A1   12/2016   Kanda et al.
2020/0025401 A1*   1/2020   Cheon .................... G05B 15/02
2020/0041151 A1*   2/2020   Tatei ........................ F24F 11/56
2020/0232671 A1   7/2020   Tasaka et al.
2021/0280179 A1*   9/2021   Liu .......................... F24F 11/30

FOREIGN PATENT DOCUMENTS

| | | |
|---|---|---|
| JP | 2005-344940 A | 12/2005 |
| JP | 2010-048548 A | 3/2010 |
| JP | 2012-112584 A | 6/2012 |
| JP | 2017-10176 A | 1/2017 |
| WO | WO-2018193539 A1 * | 10/2018 |
| WO | 2019/013316 A1 | 1/2019 |
| WO | 2020/145478 A1 | 7/2020 |
| WO | WO-2020145478 A1 * | 7/2020 |

OTHER PUBLICATIONS

International Search Report of corresponding PCT Application No. PCT/JP2020/002575 dated Feb. 18, 2020.
International Preliminary Report of corresponding PCT Application No. PCT/JP2020/002575 dated Aug. 12, 2021.

* cited by examiner

SYSTEM AND METHOD TO CONTROL AN AIR CONDITIONING SYSTEM USING A VOICE COMMAND

CROSS-REFERENCE TO RELATED APPLICATIONS

This U.S. National stage application claims priority under 35 U.S.C. § 119(a) to Japanese Patent Application No. 2019-012702, filed in Japan on Jan. 29, 2019, the entire contents of which are hereby incorporated herein by reference.

BACKGROUND

Field of the Invention

The present disclosure relates to an air conditioning system including a plurality of air conditioning devices.

Background Information

A conventional air conditioning system includes a plurality of air conditioning devices such as an indoor unit and a humidifying unit that adjusts a state of a space exemplified by temperature and humidity, as described in JP 2002-89942 A. Such an air conditioning system has a function of detecting and changing the state of the space through control of the plurality of air conditioning devices.

SUMMARY

In the air conditioning system described in JP 2002-89942 A, however, a user needs additional time and effort to input for voice-control as compared with control through input with use of buttons of a remote controller. If such an air conditioning system includes more air conditioning devices to be controlled, voice tends to include more words because the air conditioning devices need to be voice-specified.

Such an air conditioning system configured to input by voice thus needs to be improved in user convenience.

An air conditioning system according to a first aspect includes a first air conditioning device installed in a predetermined space and configured to change an air state in the predetermined space in accordance with a direction inputted by voice to an input-output device that is voice operable, and a second air conditioning device installed in the predetermined space and configured to change the air state in the predetermined space in accordance with the direction inputted by voice to the input-output device, in which upon acquisition of direction information indicating the direction not specifying a device, the air conditioning system performs processing in response to the direction with use of an air conditioning device selected from the first air conditioning device and the second air conditioning device in accordance with a predetermined condition set in advance.

The air conditioning system can select at least one of the first air conditioning device or the second air conditioning device in accordance with a predetermined condition set in advance when the direction inputted by voice is a direction not specifying a device but is direction information indicating a direction not specifying the device. The air conditioning system can perform processing in response to the direction without requiring the user to provide information for specifying the first air conditioning device and the second air conditioning device. In this way, the air conditioning system can reduce the number of words included in the voice input to the input-output device and improve user convenience when performing the processing in response to the direction.

An air conditioning system according to a second aspect is the air conditioning system according to the first aspect, further including a setting unit configured to set the predetermined condition.

In this air conditioning system, setting of a predetermined condition desired by the user can be received by the setting unit. In other words, the air conditioning system provides an environment that enables customization of the selection of the air conditioning device that performs the processing in response to a direction in a case of the direction not specifying the device.

An air conditioning system according to a third aspect is the air conditioning system according to the second aspect, in which the predetermined condition includes at least one of a condition of selecting the first air conditioning device when only the first air conditioning device is responsive to the direction and selecting the second air conditioning device when only the second air conditioning device is responsive to the direction, a condition of following a priority order inputted in advance, or a condition of performing selection in accordance with the air state in the predetermined space.

An air conditioning system according to a fourth aspect is the air conditioning system according to any of the first to third aspects, in which when the direction information includes device specifying information specifying at least one of the first air conditioning device or the second air conditioning device as a device that responds to the direction, selection is made in accordance with the device specifying information regardless of the predetermined condition.

This air conditioning system performs selection in accordance with the device specifying information regardless of the predetermined condition to achieve selection intended by the user and enhance user satisfaction.

An air conditioning system according to a fifth aspect is the system according to any of the first to fourth aspects, in which when the air state in the predetermined space is a temperature and/or a humidity of air in the predetermined space, an air conditioning device that responds to the direction is selected for adjustment of the temperature and/or the humidity indicated by the direction information, and at least one of the temperature or the humidity of the air in the predetermined space is adjusted with use of the selected air conditioning device.

An air conditioning system according to a sixth aspect is the system according to any of the first to fifth aspects, in which the temperature of the air in the predetermined space is adjusted by one of the first air conditioning device or the second air conditioning device, and the humidity of the air in the predetermined space is adjusted by another one of the first air conditioning device or the second air conditioning device.

A server according to a seventh aspect, causing, to selectively perform processing, a first air conditioning device installed in a predetermined space and configured to change an air state in the predetermined space in accordance with a direction inputted by voice to an input-output device that is voice operable, and a second air conditioning device installed in the predetermined space and configured to change the air state in the predetermined space in accordance with the direction inputted by voice to the input-output device. This server acquires direction information indicating a direction not specifying a device and transmits a command that causes an air conditioning device selected in accordance with a predetermined condition set in advance from the first air conditioning device and the second air conditioning device to perform processing in response to the direction.

A method of controlling an air conditioning system according to an eighth aspect is a method of controlling a first air conditioning device installed in a predetermined space and configured to change an air state in the predetermined space in accordance with a direction inputted by voice to an input-output device that is voice operable, and a second air conditioning device installed in the predetermined space and configured to change the air state in the predetermined space in accordance with the direction inputted by voice to the input-output device, the method including acquiring direction information indicating the direction not specifying a device, and causing an air conditioning device selected from the first air conditioning device and the second air conditioning device in accordance with a predetermined condition set in advance to perform processing in response to the direction.

A program according to a ninth aspect is a program making a CPU select a first air conditioning device and second air conditioning device for processing. The first air conditioning device installs in a predetermined space and is configured to change an air state in the predetermined space in response to a direction inputted by voice to an input-output device that is voice operable and a second air conditioning device installs in the predetermined space and is configured to change the air state in the predetermined space in response to the direction inputted by voice to the input-output device. The program makes the CPU execute steps of including acquiring direction information indicating the direction not specifying a device, and transmitting a command that causes an air conditioning device selected from the first air conditioning device and the second air conditioning device in accordance with a predetermined condition set in advance to perform processing in response to the direction.

A recording medium according to a tenth aspect is a recording medium storing the program according to the ninth aspect.

DETAILED DESCRIPTION OF EMBODIMENT(S)

(1) Overall Configuration

An air conditioning system according to the present disclosure includes a first air conditioning device, a second air conditioning device, a selector, and a transmitter. The air conditioning devices herein have a function of changing an air state in a target space. Examples of the air state in the space include temperature, humidity, a volume and direction of air blown out from a blow-out port of the air conditioning devices, or cleanliness of the air. Examples of the air conditioning device include an air conditioner, a dehumidifier, a humidifier, a dehumidifier-humidifier, a floor heater, a radiator, and a circulator.

The first air conditioning device and the second air conditioning device are installed for an identical predetermined space. This embodiment exemplifies a first room RM1 (see FIG. 1) to be described later as the predetermined space. A state of the space herein conceptually includes the air state in the space, as well as a state of a substance other than the air in the predetermined space. Examples of the state of the predetermined space also include presence of a person in the space and movement of a person in the space.

Here, an input-output device voice operable is configured to operate a different device in accordance with a signal obtained by extracting a certain characteristic from voice. It is assumed that a user inputs to the input-output device, for example, a voice "XX, set the humidity of the living room to 50% (fifty percent)" in a certain scene. At this time, the input-output device recognizes phrases corresponding to the voices of "XX", "living room", "humidity", "50%", and "set" in the voice of "XX, set the humidity of the living room to 50%". In another scene, it is assumed that the user inputs to the input-output device, for example, a voice saying "XX, operate the air conditioner in the living room at a humidity of 60% (sixty percent)". At this time, the input-output device recognizes phrases corresponding to the voices of "XX", "living room", "air conditioner", "humidity", "60%", and "operate" in the voice of "XX, operate the air conditioner in the living room at a humidity of 60%".

The phrase "XX" recognized by the input-output device is a phrase for causing the input-output device to accept an input. This phrase enables the input-output device to receive a direction by voice. In other words, this phrase enables the user to operate the input-output device by voice. When the input-output device receives a voice input of the phrase "XX,", the input-output device outputs direction information indicating a direction of contents subsequent to the "XX," to the air conditioning system according to the present disclosure.

The direction of "set the humidity of the living room to 50%" as a voice input in a certain scene does not include a phrase for specifying an air conditioning device included in the air conditioning system. In other words, the direction of the voice input in a certain scene is a direction that does not specify a device. On the other hand, the direction "operate the air conditioner in the living room at a humidity of 60%" as the voice input in another scene includes the phrase "air conditioner" that specifies the air conditioner included in the air conditioning system as the air conditioning device to be processed. The phrase "air conditioner" is device specifying information that specifies an air conditioning device. Thus, in this case, the direction information outputted from the input-output device to the air conditioning system also includes the device specifying information corresponding to the "air conditioner".

In response to a direction "set the humidity of the living room to 50%", which is a direction of voice input in a certain scene, the input-output device gives, to the air conditioning system, direction information indicating a direction to "set" the air state of "humidity" to "50%" for the air conditioning device installed at the "living room" as an installation place. For example, in an air conditioning system 10 illustrated in FIG. 1, an air conditioner 21 as the first air conditioning device and an air cleaner 22 as the second air conditioning device are installed as the air conditioning devices capable of adjusting "humidity" in the first room RM1 corresponding to the "living room". Since the direction of the voice input in a certain scene is a direction that does not specify the air conditioning device installed for the "living room" as the installation place, the air conditioning system 10 illustrated in FIG. 1 automatically selects at least one of the air conditioner 21 or the air cleaner 22 as the air conditioning device for setting the humidity to 50%.

Figure 1:
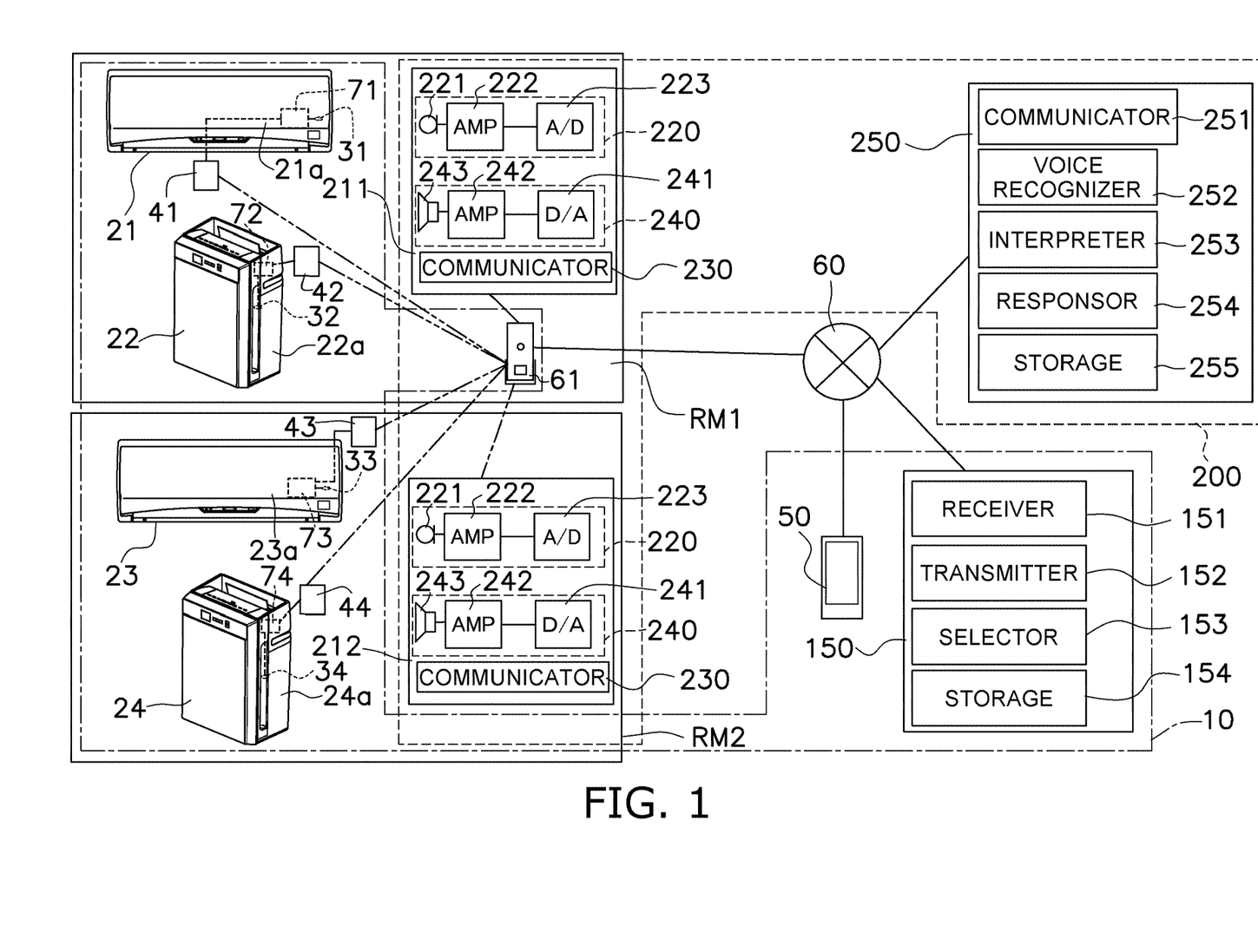
FIG. 1 is a schematic diagram depicting a configuration of an air conditioning system according to an embodiment.

In response to a direction "operate the air conditioner in the living room at a humidity of 60%" as a direction of voice input in another scene, the input-output device gives to the air conditioning system 10 in FIG. 1, for example, direction information indicating a direction to "operate" the air conditioner to set the air state of "humidity" to "60%" for the "air conditioner" as the air conditioning device installed in the installation place of the first room RM1 as the "living room". For example, since the device specifying information for specifying the air conditioner 21 as the first air conditioning device is included in the direction information, the air conditioning system 10 illustrated in FIG. 1 selects the air conditioner 21 in the first room RM1 and performs processing in response to the direction. Specifically, the air conditioning system 10 adjusts the humidity of the first room RM1 to 60% by the air conditioner 21.

(2) Input-Output Device (2-1) Voice Input-Output Device

FIG. 1 depicts an input-output device 200 including voice input-output devices 211 and 212, a router 61, and a second server 250. The router 61 is shared by the input-output device 200 and the air conditioning system 10. However, for example, two routers can be installed and the input-output device 200 and the air conditioning system 10 can be connected to different routers. For example, a plurality of routers can be used, and different routers can be installed in the first room RM1 and a second room RM2 described later. The voice input-output device 211 is disposed in the first room RM1. The voice input-output device 212 is disposed in the second room RM2 partitioned from the first room RM1 so as to be voice-isolated.

The voice input-output devices 211 and 212 each include a voice input part 220 and a sound output part 240. The voice input-output devices 211 and 212 can be configured identically, and the following description is thus made about the configuration of the voice input-output device 211, without referring to the configuration of the voice input-output device 212.

The voice input part 220 converts human voice to digital data and generates voice data to be transmitted and received via a network. The voice input part 220 exemplarily includes a microphone 221, an amplifier 222, and an A-D converter 223. The microphone 221 converts human voice to an analog electric signal. The amplifier 222 amplifies the voice analog electric signal outputted from the microphone 221. The A-D converter 223 converts the analog electric signal outputted from the amplifier 222 to a digital signal. The digital signal outputted from the A-D converter 223 is voice data. This voice data is transmitted from a communicator 230 connected to the voice input part 220. The voice data may be, for example, optionally processed for noise reduction, data compression, or the like.

The sound output part 240 converts digital sound data received via the network to human catchable sound and outputs the converted sound. Such sound output from the sound output part 240 includes voice. The sound output from the sound output part 240 also includes alarm sound or the like in addition to the voice. The sound output part 240 exemplarily includes a D-A converter 241, an amplifier 242, and a speaker 243. The D-A converter 241 receives, from the communicator 230, sound data received by the communicator 230, and converts the received sound data to an analog signal. The amplifier 242 amplifies the sound analog electric signal output from the D-A converter 241. The speaker 243 converts the analog electric signal amplified by the amplifier 242 to sound and outputs the sound.

The voice input-output devices 211 and 212 are connected to the router 61. The communicator 230 in each of the voice input-output devices 211 and 212 can be connected to a public line 60 via the router 61. The communicator 230 in each of the voice input-output devices 211 and 212 is configured to communicate with the second server 250 via the router 61 and the public line 60. The communicator 230 outputs, to the sound output part 240, sound data transmitted from a communicator 251 or the like. For example, the communicator 230 issues a command to the sound output part 240 to output from the speaker 243 in accordance with the sound data "the air conditioner in the living room is operated at a set humidity of 60%".

Exemplified herein is the case where each of the voice input-output devices 211 and 212 and the second server 250 transmits and receives via the public line 60. The voice input-output devices 211 and 212 and the second server 250 can alternatively communicate not through the public line 60. For example, each of the voice input-output devices 211 and 212 and the second server 250 can communicate via a local area network. For example, the voice input-output devices 211 and 212 and the second server 250 (computer) can be connected via signal lines to communicate directly.

The voice input-output devices 211 and 212 each have at least one account for establishment of communication with the second server 250 or the like.

(2-2) Second Server 250

The second server 250 includes the communicator 251, a voice recognizer 252, an interpreter 253, a responsor 254, and a storage 255. The second server 250 exemplarily includes a CPU (not depicted) and a memory (not depicted). The communicator 251, the voice recognizer 252, the interpreter 253, the responsor 254, and the storage 255 are embodied by exemplarily causing the CPU to execute a program stored in the memory.

The communicator 251 is connected to the public line 60 and is configured to communicate with the voice input-output devices 211 and 212, a first server 150, and a smartphone 50. The second server 250 stores, in the storage 255, an account for communication with the voice input-output devices 211 and 212, the first server 150, and the smartphone 50. Exemplified herein is a case where a user makes, with use of a single account, communication between each of the voice input-output devices 211 and 212 and the second server 250, communication between the first server 150 and the second server 250, and communication between the smartphone 50 and the second server 250.

The communicator 251 in the second server 250 receives voice data from each of the voice input-output devices 211 and 212. The voice recognizer 252 inputs the voice data at the communicator 251. The voice recognizer 252 has a voice recognizing function of converting the voice data to text data. Text data is associated with a character code and can be converted to a character. The voice recognizer 252 can optionally be configured, by means of the voice recognizing function, to recognize a speaker of voice data. The interpreter 253 inputs the text data at the voice recognizer 252.

The interpreter 253 interprets, through syntax analysis or the like, contents described in the text data. In other words, the interpreter 253 comprehends a user direction inputted by voice. The interpreter 253 outputs direction information indicating direction contents.

Described herein is a case where the interpreter 253 is provided in the second server 250. The interpreter can alternatively be provided in the first server 150 in place of the second server 250.

The communicator 251 receives direction information from the interpreter 253. In this case, the communicator 251 acquires the account stored in the storage unit 255 and an ID associated with the account. Such an ID is a code for recognition of the user of the air conditioning system 10. The communicator 251 in the second server 250 and a receiver 151 and a transmitter 152 included in the first server 150 recognize each other by means of the account and the ID of the air conditioning system 10, and transmit and receive data each other via the public line 60. The communicator 251 transmits direction information to the receiver 151.

The communicator 251 in the second server 250 receives output information from the transmitter 152 in the first server 150. Output information indicates output contents of the input-output device 200. The communicator 251 outputs the output information to the responsor 254. The responsor 254 determines response contents in accordance with the output information. The responsor 254 determines the response contents with use of artificial intelligence or the like. For example, the responsor 254 causes the speaker 243 of the voice input-output device 211 to output a voice "the air conditioner in the living room is operated at a set humidity of 60%". The responsor 254 has, for example, a speech synthesis function and generates sound data of a voice "the air conditioner in the living room is operated at a set humidity of 60%". The responsor 254 outputs, to the communicator 251, a command to cause the sound output part 240 to output sound according to the sound data. The communicator 251 transmits, to the voice input-output device 211 via the public line 60 and the router 61, the command and the sound data received from the responsor 254.

(3) Air Conditioning System 10

The air conditioning system 10 depicted in FIG. 1 includes air conditioners 21 and 23, air cleaners 22 and 24, the first server 150, the router 61, and the smartphone 50. The present embodiment relates to a case where the air conditioning system 10 includes the smartphone 50. However, the air conditioning system 10 may be constructed without including the smartphone 50.

(3-1) Air Conditioners 21 and 23 and Air Cleaners 22 and 24

Herein, descriptions will be made assuming that the air conditioner 21 corresponds to the first air conditioning device, the air cleaner 22 corresponds to the second air conditioning device, the air conditioner 23 corresponds to a third air conditioning device, and the air cleaner 24 corresponds to a fourth air conditioning device. The air conditioner 21 and the air cleaner 22 are installed for the first room RM1. The air conditioner 23 and the air cleaner 24 are installed for the second room RM2. The first room RM1 is exemplified by a living room, whereas the second room RM2 is exemplified by a bedroom. The first room RM1 exemplifies the predetermined space, and the second room RM2 exemplifies a space other than the predetermined space. Installation for the first room RM1 may include a case of setting at an appropriate site and influencing the first room RM1. For example, the air conditioner 21 installed for the first room RM1 may not be disposed in the first room RM1 and may be partially or entirely disposed outside the first room RM1.

Described herein is a case where the air conditioners 21 and 23 each have a cooling function, a heating function, a fan function, a dehumidifying function, and a humidifying function, and the air cleaners 22 and 24 each have an air cleaning function, a fan function, a dehumidifying function, and a humidifying function. However, for application of a technique in the present disclosure, the air conditioners 21 and 23 and the air cleaners 22 and 24 may not have all the above functions. It is important that the air conditioning system 10 automatically selects the first air conditioning device and the second air conditioning device when the user direction by voice does not specify the device. The processing performed with use of at least one of the fan function, the dehumidifying function, or the humidifying function can be performed by selecting the air conditioner 21 or the air cleaner 22. The air conditioner 21 as the first air conditioning device and the air cleaner 22 as the second air conditioning device have the same type of function of changing the air state in the first room RM1.

The air conditioners 21 and 23 include indoor humidity sensors 31 and 33 that detect indoor humidity. The indoor humidity sensors 31 and 33 are disposed in casings 21a and 23a near inlet ports (not depicted) of the air conditioners 21 and 23. The air cleaners 22 and 24 include indoor humidity sensors 32 and 34 that detect indoor humidity. The indoor humidity sensors 32 and 34 are disposed in casings 22a and 24a near inlet ports (not depicted) of the air cleaners 22 and 24.

The air conditioners 21 and 23 and the air cleaners 22 and 24 include controllers 71, 73, 72, and 74 and wireless LAN adapters 41 and 43 and wireless LAN adapters 42 and 44, respectively. Each of the controllers 71, 73, 72, and 74 in the air conditioners 21 and 23 and the air cleaners 22 and 24 exemplarily includes a CPU and a memory. The air conditioners 21 and 23 and the air cleaners 22 and 24 communicate with the router 61 with use of the wireless LAN adapters 41 to 44. The controllers 71, 73, 72, and 74 in the air conditioners 21 and 23 and the air cleaners 22 and 24 store an identical ID. The controllers 71, 73, 72, and 74 in the air conditioners 21 and 23 and the air cleaners 22 and 24 are configured to transmit, to the first server 150, indoor humidity values detected by the indoor humidity sensors 31, 32, 33, and 34 with use of the wireless LAN adapters 41 to 44 and the router 61.

For example, in the air conditioners 21 and 23 each connected to a commercial power source, the indoor humidity sensors 31 and 33 constantly detect indoor humidity (air humidity in the first room RM1 and air humidity in the second room RM2). Each of the air conditioners 21 and 23 periodically transmits, to the first server 150, the indoor humidity values detected by the indoor humidity sensors 31 and 33. Each of the air conditioners 21 and 23 transmits the indoor humidity value to the first server 150 every five minutes or the like.

The indoor humidity sensors 32 and 34 do not detect indoor humidity in these air cleaners 22 and 24 not in operation even when being each connected to a commercial power source. Each of the air cleaners 22 and 24 also periodically (e.g., every five minutes) transmits, to the first server 150, the indoor humidity value detected by the indoor humidity sensors 31 and 33. The air cleaners 22 and 24 being stopped to be not in operation transmit information indicating no detection of indoor humidity. In other words, the air cleaners 22 and 24 transmit, to the first server 150, indoor humidity values detected by the indoor humidity sensors 32 and 34 while being in operation, but do not transmit the indoor humidity values to the first server 150 while being stopped.

(3-2) Router 61

The router 61 is a communication device connecting a local area network including the air conditioners 21 and 23, the air cleaners 22 and 24, and the voice input-output devices 211 and 212 and a network including the public line 60. The router 61 relays data between the local area network and the network including the public line 60.

(3-3) First Server 150

The first server 150 includes the receiver 151, the transmitter 152, a selector 153, and a storage 154. The first server 150 exemplarily includes a CPU (not depicted) and a memory (not depicted). The configuration including the receiver 151, the transmitter 152, the selector 153, and the storage unit 154 is embodied by exemplarily causing the CPU to execute a program stored in the memory.

The receiver 151 periodically communicates with the router 61 and receives detection results of the indoor humidity sensors 31 to 34 transmitted from the router 61. The receiver 151 receives, via the public line 60, direction information transmitted from the communicator 251 in the second server 250. The receiver 151 and the transmitter 152 in the first server 150 and the communicator 251 in the second server 250 establish a communicable state with use of the account and the ID.

The selector 153 acquires the direction information from the receiver 151. The selector 153 selects the air conditioning device in accordance with a preset predetermined condition in order to respond to the direction described in the direction information. For example, the selector 153 is configured to select any one of an option (a) of performing processing in response to the direction with use of the air conditioner 21 as the first air conditioning device, an option (b) of performing processing in response to the direction with use of the air cleaner 22 as the second air conditioning device, or an option (c) of performing processing in response to the direction with use of both the air conditioner 21 and the air cleaner 22. For example, the selector 153 may be configured to select either the option (a) or the option (b). The selector 153 outputs the selected option to the transmitter 152.

For example, it is assumed that a voice input "XX, set the humidity of the living room to 50%" comes to the input-output device 200, and the selector 153 selects the option (a). At this time, the selector 153 transmits information of "living room", "humidity", and "50%" to the transmitter 152 together with the information that the processing is to be performed by the air conditioner 21. The transmitter 152 transmits output information including the information transmitted from the selector 153 to the input-output device 200. At this time, for example, in addition to the above information, the selector 153 reads other information such as the current humidity from the storage unit 154, and transmits the read humidity value to the transmitter 152 as the current humidity information.

The transmitter 152 of the first server 150 transmits a command based on the information transmitted from the selector 153 to the air conditioner 21 via the public line 60 and the router 61. The air conditioner 21 performs an operation to adjust the humidity of the first room RM1 (living room) to 50% in accordance with the command sent from the transmitter 152. The transmitter 152 transmits the output information including the information received from the selector 153 to the communicator 251 of the second server 250 as a reply to the direction information received from the communicator 251.

The second server 250 transmits a command to output a response such as "the air conditioner in the living room is operated at a set humidity of 60%" from the voice input-output device 211 disposed in the living room to the voice input-output device 211 together with sound data including the synthesized voice. At this time, the command of the second server 250 may include another command, for example, a command to output the humidity of the first room RM1 by voice.

In this manner, when issuing a direction to the voice input-output device 211 to provide information on the "humidity" in the "living room" by voice, the user can issue a direction that does not specify the device. Even when the user does not specify the device, the air conditioning system 10 selects at least one of the air conditioner 21 or the air cleaner 22 by automatic control and performs processing in accordance with the user direction.

The selector 153 also selects the air conditioning device when the user issues a direction that specifies the device. The selection by the selector 153 performed in response to the direction specifying the device by the user is different from the selection performed in response to the direction not specifying the device in that the latter selection is performed in accordance with a predetermined condition, whereas the former selection is performed in accordance with the device specifying information. An operation of the first server 150 and the second server 250 for issuance of the direction specifying the device after the selection are similar to an operation for issuance of the direction not specifying the device.

Next, a case where the selector 153 selects both the air conditioner 21 and the air cleaner 22 will be described. When both are selected, a command is sent to the selected air conditioning device via the public line 60 and the router 61, as in the case where either one is selected. Both the air conditioner 21 and the air cleaner 22 are operated to perform dehumidification and humidification with a set humidity of 50%. The air conditioner 21 and the air cleaner 22 have the independent controllers 71 and 72, respectively. The controllers 71 and 72 control the air conditioner 21 and the air cleaner 22 such that the humidity detected independently by the indoor humidity sensors 31 and 32 becomes 50%, and adjust the indoor humidity in the first room RM1. When the humidity is adjusted in this way, the humidifying function and the dehumidifying function are improved as compared with when the indoor humidity is adjusted by only one of the air conditioner 21 or the air cleaner 22.

Although the operation of the first server 150 with respect to the air conditioner 21 and the air cleaner 22 has been described, the operation of the first server 150 with respect to the air conditioner 23 and the air cleaner 24 can be similarly configured. Thus, the operation of the first server 150 with respect to the air conditioner 23 and the air cleaner 24 is not referred here.

(3-3-1) Predetermined Condition for Selection

The selector 153 selects an option in accordance with a preset predetermined condition. The predetermined condition is set appropriately in accordance with the configuration of the air conditioning system 10. Hereinafter, the predetermined condition will be described with a plurality of specific examples of the predetermined condition.

(3-3-1-1) Example of Predetermined Condition

In the air conditioning system 10 illustrated in FIG. 1, for example, the following three conditions Re1 to Re3 are set for selection of the air conditioner 21 and the air cleaner 22. The selection of the air conditioner 23 and the air cleaner 24, which can be set similarly to selection conditions of the air conditioner 21 and the air cleaner 22, is not referred here.

The first condition Re1 is a condition of selecting the air conditioner 21 when only the air conditioner 21 can respond to the direction and selecting the air cleaner 22 when only the air cleaner 22 can respond to the direction. In accordance with the condition Re1, for example, the selector 153 selects the air conditioner 21 in a case where the air state of the first room RM1 is changed by the cooling function and/or the heating function, and selects the air cleaner 22 in a case where the air state of the first room RM1 is changed by the air cleaning function.

The second condition Re2 is, for example, a condition of performing selection in accordance with the air state in the first room RM1 as a predetermined space. In this case, the air state and the selected air conditioning device are associated with each other. Next, a specific example of this second condition Re2 will be described. In a specific example in accordance with the condition Re2, the selector 153 selects both the air conditioner 21 and the air cleaner 22, for example, when the set humidity is dissociated from the current humidity by 30% or more. In a specific example in accordance with the condition Re2, the selector 153 selects the air cleaner 22, for example, when the set humidity is lower than the current humidity and is dissociated from the current humidity by only 10% or more and less than 30%. In a specific example in accordance with the condition Re2, the selector 153 selects the air conditioner 21, for example, when the set humidity is higher than the current humidity and is dissociated from the current humidity by only 20% or more and less than 30%. In this example of the condition Re2, in short, both are selected when the set humidity is dissociated from the current humidity by a first predetermined value or more, the second air conditioning device is selected when the set humidity is smaller than the current humidity and dissociated from the current humidity only by a second predetermined value or more and less than the first predetermined value, and the first air conditioning device is selected when the set humidity is larger than the current humidity and is dissociated from the current humidity only by the second predetermined value or more and less than the first predetermined value. Further, when the set humidity is dissociated from the current humidity by only less than the second predetermined value (10% in this case), the selector 153 follows the third condition Re. As the current humidity, for example, a humidity value detected by the indoor humidity sensors 31 and 32 is used. Alternatively, the humidity value transmitted from the air conditioner 21 and the air cleaner 22 to the first server 150 and stored in the storage 154 is used.

The third condition Re3 is, for example, a condition of following the priority order inputted in advance. In accordance with the condition Re3, for example, in a case where a predetermined condition is set such that the air conditioner 21 is prioritized over the air cleaner 22 in a direction to use the dehumidifying function and/or the humidifying function, the selector 153 selects the air conditioner 21 upon receipt of a direction that does not specify a device and intends to use a humidifier-dehumidifier.

In the above example, the selector 153 performs selection in accordance with the three conditions Re1 to Re3, but the predetermined condition set in the selector 153 is not limited to the three conditions Re1 to Re3. The predetermined condition may be, for example, a combination of a condition of selecting the first air conditioning device when only the first air conditioning device can respond to the direction and selecting the second air conditioning device when only the second air conditioning device can respond to the direction, and a condition of following the priority order inputted in advance. The predetermined condition may be, for example, a combination of a condition of selecting the first air conditioning device when only the first air conditioning device can respond to the direction and selecting the second air conditioning device when only the second air conditioning device can respond to the direction, and a condition of performing selection in accordance with the air state in the predetermined space. The predetermined condition may be set by, for example, a service engineer, or may be set at a factory or the like during manufacturing. Such a predetermined condition is stored in the storage 154, for example, and the selector 153 reads the predetermined condition from the storage 154 when performing selection.

(3-3-1-2) Another Example of Predetermined Condition

An example of the predetermined condition is an example of a case where either or both of the air conditioning devices have one function. However, the predetermined condition is not limited to such a condition. For example, when it is directed to change the air state by exerting two different functions, it is also possible to set the predetermined condition so as to make the functions exerted by the first air conditioning device and the second air conditioning device different.

Of the two different functions (first function and second function), for example, the first function is a function of adjusting humidity, and the second function is a function of adjusting temperature. Alternatively, for example, the first function is an air cleaning function, and the second function is a function of adjusting temperature. Alternatively, for example, the first function is a function of moving air in a space (fan function), and the second function is a function of adjusting humidity.

For example, it is assumed that the user issues a direction "set the temperature of the living room to 24 degrees and the humidity of the living room to 50%" by voice. There are several options for changing the air state in the first room RM1 (predetermined space) in accordance with such a direction. A first option is to perform processing in accordance with the direction with use of the cooling function, the heating function, the dehumidifying function, and/or the humidifying function of the air conditioner 21 but without use of the air cleaner 22. A second option is to perform processing in accordance with the direction with use of the cooling function and the heating function of the air conditioner 21 and also with use of the dehumidifying function and the humidifying function of the air cleaner 22. A third option is to perform processing in accordance with the direction with use of the cooling function, the heating function, the dehumidifying function, and the humidifying function of the air conditioner 21 and also with use of the dehumidifying function and the humidifying function of the air cleaner 22. Another option is, for example, to perform processing in accordance with the direction with use of the cooling function, the heating function, and the dehumidifying function of the air conditioner 21 and also with use of the humidifying function of the air cleaner 22. Here, a case where the selector 153 is configured to select any of the first to third options will be described.

The three conditions Re1 to Re3 are set as predetermined conditions used for selection of processing with use of a plurality of these functions. The selection of the air conditioner 23 and the air cleaner 24, which can be set similarly to the selection conditions of the air conditioner 21 and the air cleaner 22, is not referred here.

The first condition Re1 is a condition of selecting the air conditioner 21 when only the air conditioner 21 can respond to the direction and selecting the air cleaner 22 when only the air cleaner 22 can respond to the direction. In accordance with the condition Re1, the selector 153 selects the air conditioner 21 to change the air state in the first room RM1 by the cooling function and/or the heating function, for example. However, since both the air conditioner 21 and the air cleaner 22 can respond by the dehumidifying function and the humidifying function, the selector 153 cannot perform selection in accordance with the first condition Re1.

The second condition Re2 is, for example, a condition of performing selection in accordance with the air state in the first room RM1 as a predetermined space. In this case, the air state and the selected air conditioning device are associated with each other. Next, a specific example of this second condition Re2 will be described. In a specific example in accordance with the condition Re2, the selector 153 selects both the air conditioner 21 and the air cleaner 22, for example, when the set humidity is dissociated from the current humidity by 30% or more. In accordance with this selection result, the air conditioner 21 exerts the cooling function and/or the heating function, the dehumidifying function, and the humidifying function, and the air cleaner 22 exerts the dehumidifying function and the humidifying function.

In a specific example in accordance with the condition Re2, the selector 153 selects the air cleaner 22, for example, when the set humidity is lower than the current humidity and is dissociated from the current humidity by only 10% or more and less than 30%. In accordance with the selection result, the air conditioner 21 exerts the cooling function and/or the heating function, and the air cleaner 22 exerts the dehumidifying function and the humidifying function.

In a specific example in accordance with the condition Re2, the selector 153 selects the air conditioner 21, for example, when the set humidity is higher than the current humidity and is dissociated from the current humidity by only 20% or more and less than 30%. In accordance with the selection result, the air conditioner 21 exerts the cooling function and/or the heating function, the dehumidifying function, and the humidifying function, but the operation of the air cleaner 22 is stopped.

Further, when the set humidity is dissociated from the current humidity by only less than the second predetermined value (10% in this case), the selector 153 follows the third condition Re3. The third condition Re3 is, for example, a condition of following the priority order inputted in advance. In accordance with the condition Re3, for example, in a case where a predetermined condition is set such that the air cleaner 22 is prioritized over the air conditioner 21 in a direction to use the dehumidifying function and/or the humidifying function, the selector 153 selects the air cleaner 22 upon receipt of a direction that does not specify a device and intends to use the humidifier-dehumidifier. In accordance with the selection result, the air conditioner 21 exerts the cooling function and/or the heating function, and the air cleaner 22 exerts the dehumidifying function and the humidifying function.

In the above example, the selector 153 performs selection in accordance with the three conditions Re1 to Re3. However, as described above, the predetermined condition set in the selector 153 is not limited to the three conditions Re1 to Re3.

(3-3-2) Device Specifying Information for Selection

It has already been described that when the direction information includes the device specifying information, in other words, when the direction specifies the device, the air conditioning system is configured to respond in accordance with the device specifying information. The device specifying information specifies at least one of the first air conditioning device or the second air conditioning device as a device to be relevant to a response to direction information.

The input-output device 200 depicted in FIG. 1 is configured to include device specifying information in direction information. Exemplarily described is a case where the user inputs, to the voice input-output device 211, a voice "operate the air cleaner in the living room at a humidity of 50%". This voice message includes the words "air cleaner" as device specifying information. The voice input part 220 converts the voice inputted to the voice input-output device 211 to voice data. The voice input-output device 211 transmits this voice data to the second server 250 via the router 61 and the public line 60. The second server 250 extracts device specifying information indicating that the user has specified the "air cleaner" as a device configured to detect an indoor temperature value through voice recognition by the voice recognizer 252 and interpretation by the interpreter 253, and transmits direction information including the device specifying information to the receiver 151 in the first server 150. The receiver 151 outputs the direction information including the device specifying information to the selector 153. As described in (3-3-1) above, descriptions will be made about a case where the priority order is set such that the air conditioner 21 is prioritized over the air cleaner 22 when the dehumidifying function and/or the humidifying function is used. The selector 153 is configured to perform selection in accordance with device specifying information regardless of the predetermined condition when the device specifying information is included in direction information, and thus selects the "air cleaner" regardless of the priority order.

The selector 153 that has selected the air cleaner 22 in the living room in accordance with the device specifying information outputs, to the transmitter 152, information indicating that the selector 153 has selected the air cleaner 22. When the air cleaner 22 is not operated, the air cleaner 22 is brought into an operation state by a command from the first server 150 to the air cleaner 22, and when the air cleaner 22 does not exert the dehumidifying function and/or the humidifying function, the operation state is changed for these functions to be exerted.

(4) Operation of Air Conditioning System 10 for Adjusting Humidity

Figure 2:
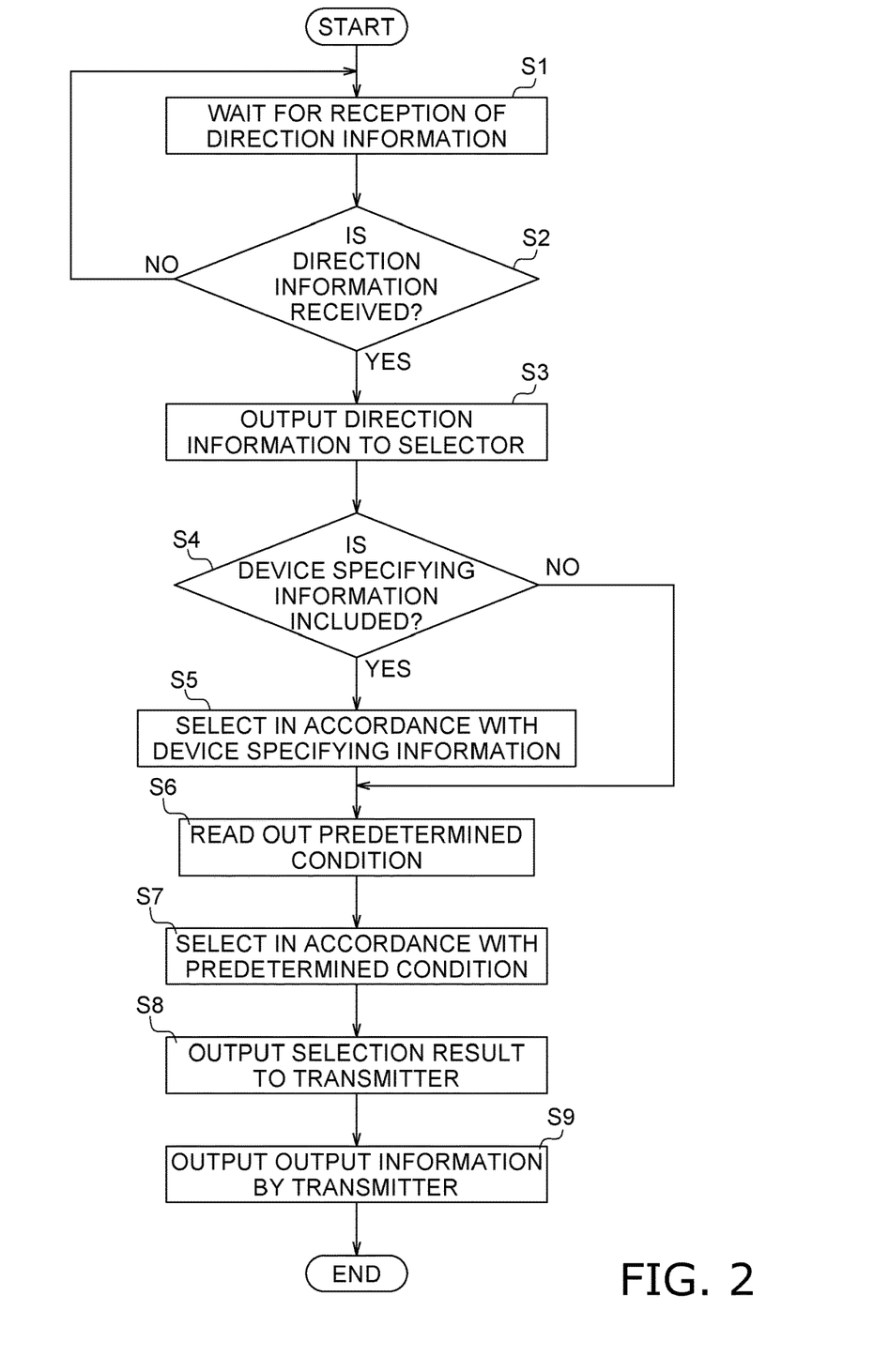
FIG. 2 is a flowchart depicting an example of operation of the air conditioning system.

Operation of the air conditioning system 10 related to the adjustment of humidity already mentioned will be briefly described with reference to a flowchart.

The first server 150 in the air conditioning system 10 waits for reception of direction information (step S1). When the first server 150 receives direction information (Yes in step S2), the receiver 151 outputs the direction information to the selector 153. The selector 153 determines whether the direction information includes device specifying information (step S4).

When the direction information includes device specifying information (Yes in step S4), the selector 153 selects the air conditioning device in accordance with the device specifying information (step S5). When the direction information does not include device specifying information (No in step S4), the selector 153 reads a predetermined condition out of the storage 154 (step S6). The selector 153 selects the air conditioner 21 and the air cleaner 22 as the air conditioning devices in accordance with the predetermined condition (step S7). The selector 153 outputs information indicating a selection result to the transmitter 152 (step S8).

The transmitter 152 transmits, to the input-output device 200, output information for output of the input-output device 200 in accordance with an option selected by the selector 153 (step S9).

(5) Modifications (5-1) Modification A

The above embodiment relates to the case where a set condition is preliminarily stored in the storage unit 154 and is not changed halfway. The air conditioning system 10 can alternatively include a setting unit 155 depicted in FIG. 3. When the setting unit 155 receives data describing a predetermined condition, the setting unit 155 sets the predetermined condition. For example, the user transmits, from the smartphone 50 to the first server 150 via the public line 60, the data describing the predetermined condition. The smartphone 50 stores an account and an ID, and can transmit and receive data to and from the first server 150 using the account and the ID.

Figure 3:
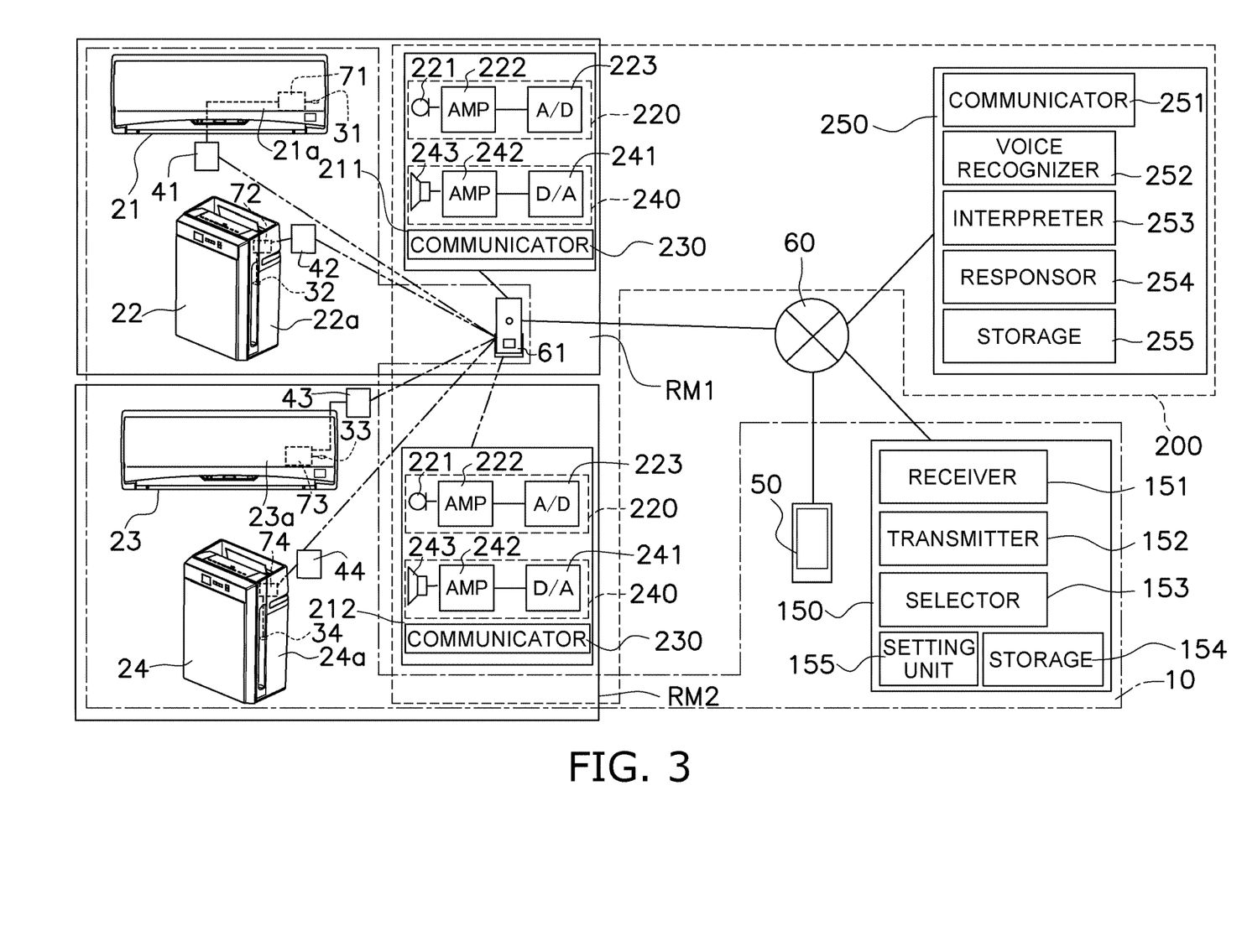
FIG. 3 is a schematic diagram depicting a configuration of an air conditioning system according to Modification A.

The receiver 151 having received the data describing the predetermined condition outputs the data describing the predetermined condition to the setting unit 155. The setting unit 155 sets the predetermined condition in accordance with the data describing the predetermined condition. For example, the setting unit 155 changes a predetermined condition stored in the storage 154 in accordance with the data describing the predetermined condition and transmitted from the smartphone 50.

The above embodiment relates to the case where the storage unit 154 stores the priority order as a predetermined condition. In such a case, for example, in a case where the dehumidifying function and/or the humidifying function is used, it is assumed that a condition that the air conditioner 21 is preferentially selected over the air cleaner 22 is stored in the storage 154. The user can set the air cleaner 22 to be prioritized over the air conditioner 21 by rewriting the priority order by the setting unit 155.

For example, the user can use the setting unit 155 to change the setting so as to follow the condition of following the priority order inputted in advance when both the air conditioner 21 and the air cleaner 22 are operated, and to follow the condition of selecting the air conditioner 21 or the air cleaner 22 that is operated when only the air conditioner 21 or only the air cleaner 22 is operated.

The user can cause the setting unit 155 to change the condition Re3 of following the priority order set in advance to the condition Re2 of performing selection in accordance with the state of the predetermined space. For example, the air conditioner 21 may include a human detection sensor configured to detect whether there is any human in the first room RM1. The air conditioner 21 periodically (e.g., every five minutes) transmits, to the first server 150, a detection result of the human detection sensor. The storage 154 stores the detection result of the human detection sensor received by the first server 150. The predetermined condition can be exemplarily set to have a condition of selecting the air cleaner 22 when there is any human in the first room RM1 serving as the predetermined space, and selecting the air conditioner 21 when there is no human in the first room RM1. Such a predetermined condition exemplifies the condition of performing selection in accordance with the state of the predetermined space. The selector 153 is configured to read, out of the storage 154, the detection result of the human detection sensor and the predetermined condition of performing selection in accordance with the detection result of the human detection sensor (the state of the predetermined space) stored in the storage 154, to select in accordance with the predetermined condition.

(5-2) Modification B

The above embodiment relates to the case where the voice input-output device 211 is provided separately from the air conditioner 21 and the air cleaner 22. The voice input-output device 211 may alternatively be incorporated in the air conditioner 21 or the air cleaner 22. Still alternatively, part of constituent elements of the voice input-output device 211 may be incorporated in the air conditioner 21 and/or the air cleaner 22. For example, the sound output part 240 may be incorporated in the air conditioner 21 and/or the air cleaner 22. For example, the voice input part 220 may be incorporated in the air conditioner 21 and/or the air cleaner 22. In a case where the voice input part 220 is incorporated in the air conditioner 21 and/or the air cleaner 22, the controller 71 or 72 and the wireless LAN adapter 41 or 42 in the air conditioner 21 and/or the air cleaner 22 substitute for the communicator 230. The voice input-output device 211 may alternatively be integrated with any other home appliance installed in the first room RM1.

The voice input-output device 211 may still alternatively be incorporated in the smartphone 50. In a case where the voice input-output device 211 is incorporated in the smartphone 50, temperature notification according to a voice direction by the user may be made with use of a speaker of the smartphone 50 or with use of a touch screen of the smartphone 50. In response to the temperature notification according to the voice direction by the user, the smartphone 50 may be exemplarily configured to display "the air conditioner in the living room is operated at a set humidity of 60%" on the touch screen. Such a case of displaying "the air conditioner in the living room is operated at a set humidity of 60%" on the touch screen also corresponds to the case where the transmitter 152 transmits, to the input-output device 200, output information for output of the input-output device 200 in accordance with an option selected by the selector 153. In this case, the second server 250 having received the output information from the transmitter 152 transmits, to the smartphone 50, text data indicating "the air conditioner in the living room is operated at a set humidity of 60%". The air conditioning system 10 may alternatively be configured to transmit, to the smartphone 50, sound data "the air conditioner in the living room is operated at a set humidity of 60%" along with this text data.

(5-3) Modification C

The above embodiment relates to the case where functional blocks of the first server 150 and functional blocks of the second server are each embodied by causing the CPU to interpret and execute the executable program stored in the memory and data. The above embodiment also relates to the case where the controllers 71, 73, 72, and 74 in the air conditioners 21 and 23 and the air cleaners 22 and 24 execute control by causing the CPU to interpret and execute the executable program stored in the memory and data. Alternatively, the program and the data may be introduced into the memory via a recording medium, or may be directly executed on the recording medium. Still alternatively, the program and the data may be introduced from the recording medium into the memory via a telephone line, a conveyance path, or the like. In some embodiments, the functional blocks may be each constituted by an integrated circuit (IC) configured to achieve a function similar to the function achieved with use of the CPU and the memory. In some embodiments, the controllers 71, 73, 72, and 74 in the air conditioners 21 and 23 and the air cleaners 22 and 24 may be each constituted by an integrated circuit (IC) configured to execute control similar to the control executed with use of the CPU and the memory. Examples of the IC mentioned herein include a large-scale integrated circuit (LSI), an application-specific integrated circuit (ASIC), a gate array, a field programmable gate array (FPGA), and the like.

(5-4) Modification D

The above embodiment relates to the case where the air conditioner 21 as the first air conditioning device and the air cleaner 22 as the second air conditioning device are provided for the first room RM1 as the single predetermined space. Air conditioning devices installed in the single predetermined space are not limited to these two devices of the first air conditioning device and the second air conditioning device. For example, a dehumidifier having a dehumidifying function and a fan function or a humidifier having a humidifying function and a fan function may be installed in the first room RM1 as another air conditioning device. The dehumidifier or the humidifier installed in the first room RM1 includes an indoor humidity sensor, a controller, and a wireless LAN adapter. With such a configuration, in a case where the selector 153 is directed by the user to "lower the humidity in the living room" or "increase the humidity in the living room", the selector 153 automatically selects, for example, an appropriate device from the air conditioner 21, the air cleaner 22, and the dehumidifier or the humidifier in accordance with a predetermined condition without a voice direction of words for device selection. The selector 153 can be configured to automatically select one of similar detection information pieces even in a case where four or more air conditioning devices are installed in an identical predetermined space or even in a similar case with no voice direction of words for device selection.

(5-5) Modification E

The above embodiment assumes the first room RM1 as the predetermined space. The predetermined space may alternatively be assumed as a house including the first room RM1 and the second room RM2. When such a house corresponds to the predetermined space, the air conditioner 21 corresponds to the first air conditioning device and the air conditioner 23 corresponds to the second air conditioning device. Assumed is an exemplarily case where the user asks "Is the air conditioner in the house operated?" to the voice input-output device 211 installed in the first room RM1, the voice input-output device 212 installed in the first room RM1, or the smartphone 50 incorporating a voice input-output device.

Operation of the air conditioning system 10 having received direction information from the second server 250 will be described as follows with reference to FIG. 2. For example, the first server 150 receives direction information indicating "notify operation state of the air conditioner in the house" (Yes in step S2), and the receiver 151 outputs the direction information to the selector 153. The selector 153 determines whether the direction information includes device specifying information (step S4).

Because this direction information does not include device specifying information (No in step S4), the selector 153 reads a priority order as predetermined information out of the storage 154 (step S6). In the priority order read from the storage 154, the air conditioner 21 in the living room is prioritized over the air conditioner 23 in the bedroom. The selector 153 selects the air conditioner 21 in the living room in accordance with the priority order (step S7). The selector 153 outputs selection information indicating a selection result to the transmitter 152 (step S8). The transmitter 152 transmits, to the input-output device 200, output information for output of the input-output device 200 in accordance with an option selected by the selector 153 (step S9). The input-output device 200 refers to the information on the operation state transmitted from the air conditioners 21 and 22 or the information stored in the storage 154, and returns sound data indicating, for example, "the air conditioner in the living room of the house is stopped" to the device to which the direction is inputted in the voice input-output devices 211 and 212 and the smartphone 50.

For example, as a predetermined condition, it is possible to set a condition that the air conditioner 21 is prioritized when the question is asked between 8:00 am and 8:00 pm, and the air conditioner 23 is prioritized when the question is asked between 8:01 pm and 7:59 am. The predetermined condition thus set enables notification of temperature in the living room more frequently used relatively during daytime at appropriate timing without designation of any place in the house, and notification of temperature in the bedroom more frequently used relatively during nighttime at appropriate timing without designation of any place in the house.

(5-6) Modification F

Figure 4:
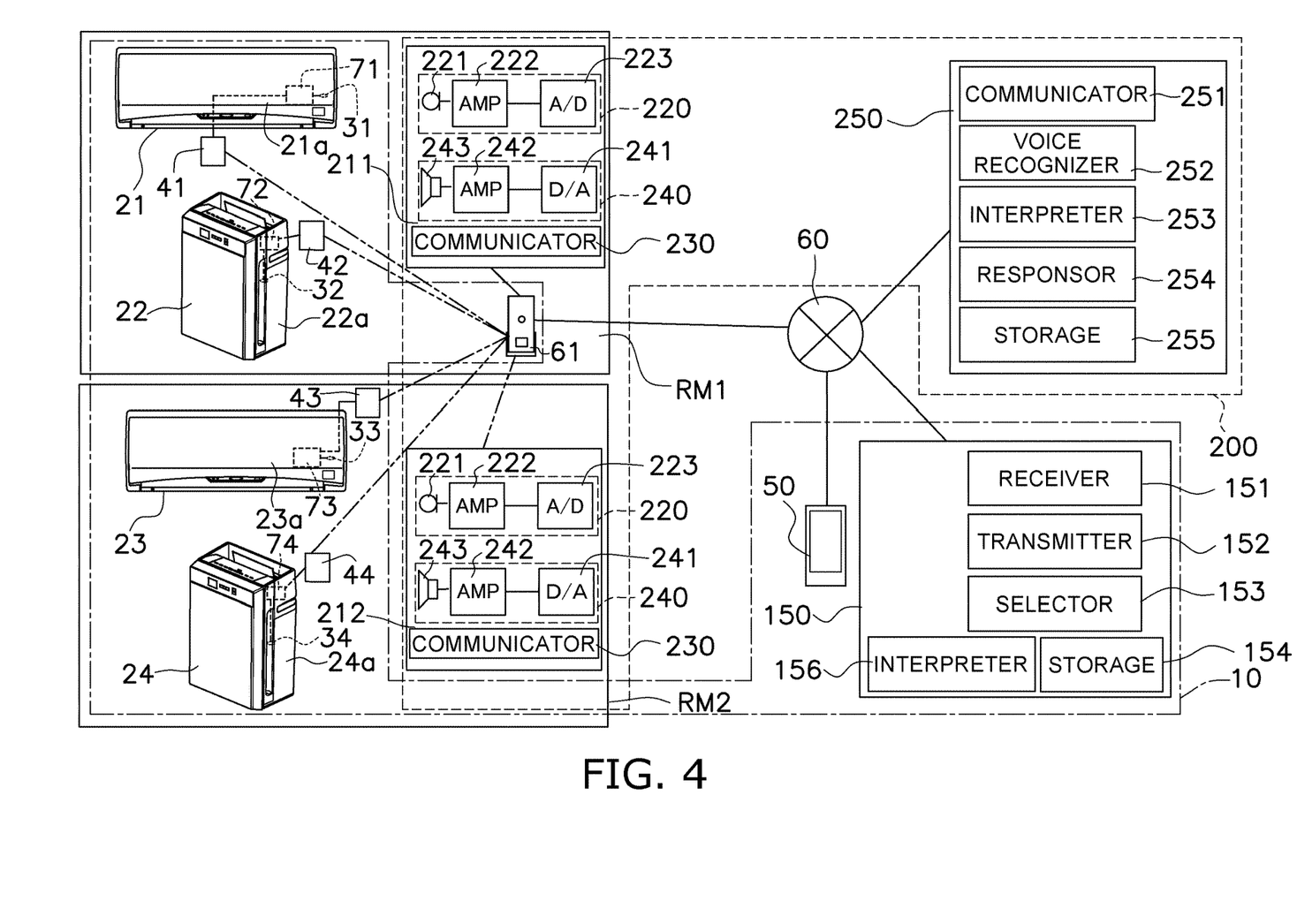
FIG. 4 is a schematic diagram depicting a configuration of an air conditioning system according to Modification F.

As mentioned in the description of the above embodiment, the first server 150 may alternatively include an interpreter 156 as depicted in FIG. 4. The interpreter 156 in the first server 150 functions similarly to the interpreter 253 in the second server 250 already described. The second server 250 may include the interpreter 253 when the first server 150 includes the interpreter 156.

(6) Characteristics 6-1

In the air conditioning system 10 described in the above embodiment and modifications, the air conditioner 21 as the first air conditioning device and the air cleaner 22 as the second air conditioning device are installed in the first room RM1 as the predetermined space. In other words, the air conditioner 21 and the air cleaner 22 can change the air state in the first room RM1. The air conditioner 21 and the air cleaner 22 change the air state in accordance with a direction inputted by voice to the input-output device 200. The directions inputted to the input-output device 200 include two types of directions, which are a direction specifying whether the air conditioning device that performs processing is the air conditioner 21 or the air cleaner 22 or both the air conditioner 21 and the air cleaner 22, and a direction not specifying the air conditioning device that performs processing. The air conditioning system 10 is configured to respond to any of these two types of directions. When the air conditioning system 10 acquires the direction information indicating the direction not specifying the device, the selector 153 of the first server 150 can automatically select at least one of the air conditioner 21 or the air cleaner 22 in accordance with a predetermined condition. In other words, the air conditioning system 10 is configured to perform the processing in response to the direction without requiring the user to provide information specifying the air conditioner 21 and the air cleaner 22 such as whether the device to perform the processing is the air conditioner 21 or the air cleaner. The air conditioning system 10 can perform processing in response to the direction without specifying the air conditioning device by the user. This means that the air conditioning system 10 reduces the number of words included in the input voice by omitting the words "air conditioner" or the words "air cleaner" from the voice input to the input-output device 200 by the user. In other words, the air conditioning system 10 improves user convenience.

6-2

In the air conditioning system 10 illustrated in FIG. 3, setting of a desired predetermined condition by a user or the like can be received by the setting unit 155. In other words, the air conditioning system 10 including the setting unit 155 can provide the user or the like with an environment that enables customization of the selection of the air conditioning device that performs the processing in response to the direction not specifying the device. Even in a case where the user or the like issues a direction not specifying the device by the setting unit 155, the user or the like can perform setting such that the processing is performed with use of the air conditioning device desired by the user, and thus, a degree of satisfaction with the air conditioning system 10 is improved.

6-3

In the air conditioning system 10 described in the above embodiment and modifications, the predetermined condition set in advance includes the condition Re1 of selecting the air conditioner 21 when only the air conditioner 21 can respond to the direction and selecting the air cleaner 22 when only the air cleaner 22 can respond to the direction, the condition Re2 of performing selection in accordance with the air state in the first room RM1, and the condition Re3 of following the priority order inputted in advance. Use of the three conditions Re1 to Re3 can easily embody the air conditioning system 10 that performs processing in response to the direction with use of the air conditioning device selected from the air conditioner 21 and the air cleaner 22 in accordance with the predetermined condition upon acquisition of the direction information indicating the direction not specifying the device. Note that the air conditioning system 10 can be easily embodied with use of only the condition Re1 and the condition Re2, and the air conditioning system 10 can be easily embodied with use of only the condition Re1 and the condition Re3.

6-4

The air conditioning system 10 described in the above embodiment and modifications selects the air conditioning device that performs processing in response to the direction in accordance with the device specifying information regardless of the predetermined condition. Thus, the selection is made as intended by the user and user satisfaction is enhanced.

6-5

In the air conditioning system 10 described in the above embodiment and modifications, when the air state in the first room RM1 is the temperature and/or humidity of the air in the first room RM1, an air conditioning device that responds to the direction is selected from the air conditioner 21 and the air cleaner 22 for adjustment of the temperature and/or humidity indicated by the direction information. The air conditioning system 10 adjusts at least one of the temperature or the humidity of the air in the first room RM1 with use of the selected air conditioning device. The air conditioning system 10 can appropriately adjust the temperature and/or humidity indicated by the direction information by selecting an air conditioning device that responds to the direction from the air conditioner 21 and the air cleaner 22.

6-6

In the air conditioning system 10 described in the above embodiment and modifications, the temperature of the air in the first room RM1 can be adjusted by the air conditioner 21, and the humidity can be adjusted by the air cleaner 22. The air conditioning system 10 can appropriately assign roles to the air conditioner 21 and the air cleaner 22 to provide a user with a comfortable environment of the first room RM1.

The embodiment of the present disclosure has been described above. Various modifications to modes and details should be available without departing from the object and the scope of the present disclosure recited in the claims.

REFERENCE SIGNS LIST

10: air conditioning system
21: air conditioner (example of first air conditioning device)
22: air cleaner (example of second air conditioning device)
152: transmitter
153: selector
155: setting unit
200: input-output device

CITATION LIST

Patent Literature

Patent Literature 1: JP 2002-89942 A

What is claimed is:

1. An air conditioning system comprising:
a first air conditioning device installed in a predetermined space, the first air conditioning device being configured to change an air state in the predetermined space in accordance with a direction inputted by voice to a single, external input-output device that is voice operable; and
a second air conditioning device installed in the predetermined space, the second air conditioning device being configured to change the air state in the predetermined space in accordance with the direction inputted by voice to the single, external input-output device,
upon acquisition of first direction information indicating the direction not specifying a device, the air conditioning system performing processing in response to the direction with use of an air conditioning device selected from the first air conditioning device and the second air conditioning device in accordance with a predetermined condition set in advance, wherein the predetermined condition includes at least one of a condition of performing selection in accordance with the air state in the predetermined space.

2. The air conditioning system according to claim 1, further comprising:
a setting unit configured to set the predetermined condition.

3. The air conditioning system according to claim 2, wherein
when a second direction information including device specifying information specifying at least one of the first air conditioning device and the second air conditioning device as a device responding to the direction is acquired, selection is made in accordance with the device specifying information regardless of the predetermined condition.

4. The air conditioning system according to claim 2, wherein
when the air state in the predetermined space is at least one of a temperature and a humidity of air in the predetermined space,
an air conditioning device that responds to the direction is selected for adjustment of at least one of the temperature and the humidity indicated by the first direction information, and
at least one of the temperature and the humidity of the air in the predetermined space is adjusted with use of the selected air conditioning device.

5. The air conditioning system according to claim 2, wherein
the temperature of the air in the predetermined space is adjusted by one of the first air conditioning device and the second air conditioning device, and the humidity of the air in the predetermined space is adjusted by another one of the first air conditioning device and the second air conditioning device.

6. The air conditioning system according to claim 2, wherein the predetermined condition further includes at least one of a condition of
selecting the first air conditioning device when only the first air conditioning device is responsive to the, direction and
selecting the second air conditioning device when only the second air conditioning device is responsive to the direction, a condition of following a priority order inputted in advance.

7. The air conditioning system according to claim 6, wherein
when a second direction information including device specifying information specifying at least one of the first air conditioning device and the second air conditioning device as a device responding to the direction is acquired, selection is made in accordance with the device specifying information regardless of the predetermined condition.

8. The air conditioning system according to claim 1, wherein
when the air state in the predetermined space is at least one of a temperature and a humidity of air in the predetermined space,
an air conditioning device that responds to the direction is selected for adjustment of at least one of the temperature and the humidity indicated by the fir direction information, and
at least one of the temperature and the humidity of the air in the predetermined space is adjusted with use of the selected air conditioning device.

9. The air conditioning system according to claim 6, wherein
the temperature of the air in the predetermined space is adjusted by one of the first air conditioning device and the second air conditioning device, and the humidity of the air in the predetermined space is adjusted by another one of the first air conditioning device and the second air conditioning device.

10. The air conditioning system according to claim 1, wherein
when a second direction information including device specifying information specifying at least one of the first air conditioning device and the second air conditioning device as a device responding to the direction is acquired, selection is made in accordance with the device specifying information regardless of the predetermined condition.

11. The air conditioning system according to claim 10, wherein
when the air state in the predetermined space is at least one of a temperature and a humidity of air in the predetermined space,
an air conditioning device that responds to the direction is selected for adjustment of at least one of the temperature and the humidity indicated by the fir direction information, and
at least one of the temperature and the humidity of the air in the predetermined space is adjusted with use of the selected air conditioning device.

12. The air conditioning system according to claim 10, wherein
the temperature of the air in the predetermined space is adjusted by one of the first air conditioning device and the second air conditioning device, and the humidity of the air in the predetermined space is adjusted by another one of the first air conditioning device and the second air conditioning device.

13. The air conditioning system according to claim 6, wherein
when the air state in the predetermined space is at least one of a temperature and a humidity of air in the predetermined space,
an air conditioning device that responds to the direction is selected for adjustment of at least one of the temperature and the humidity indicated by the first direction information, and at least one of the temperature and the humidity of the air in the predetermined space is adjusted with use of the selected air conditioning device.

14. The air conditioning system according to claim 6, wherein
the temperature of the air in the predetermined space is adjusted by one of the first air conditioning device and the second air conditioning device, and the humidity of the air in the predetermined space is adjusted by another one of the first air conditioning device and the second air conditioning device.

15. The air conditioning system according to claim 1, wherein
the temperature of the air in the predetermined space is adjusted by one of the first air conditioning device and the second air conditioning device, and the humidity of the air in the predetermined space is adjusted by another one of the first air conditioning device and the second air conditioning device.

16. A server configured to cause a first air conditioning device and a second air conditioning device to selectively perform processing, the first air conditioning device being installed in a predetermined space, the first air conditioning device being configured to change an air state in the predetermined space in response to a direction inputted by voice to a single, external input-output device that is voice operable, and the second air conditioning device being installed in the predetermined space, the second air conditioning device being configured to change the air state in the predetermined space in response to the direction inputted by voice to the single, external input-output device, the server comprising:
a receiver configured to acquire first direction information indicating the direction not specifying the device; and
a transmitter configured to transmit a command in order to cause an air conditioning device selected from the first air conditioning device and the second air conditioning device in accordance with a predetermined condition set in advance to perform processing in response to the direction, wherein the predetermined condition includes at least one of a condition of performing selection in accordance with the air state in the predetermined space.

17. A method of controlling an air conditioning system, the method being a method of controlling
a first air conditioning device installed in a predetermined space, the first air conditioning device being configured to change an air state in the predetermined space in response to a direction inputted by voice to a single, external input-output device that is voice operable; and
a second air conditioning device installed in the predetermined space, the second air conditioning device being configured to change the air state in the predetermined space in response to the direction inputted by voice to the single, external input-output device, the method comprising:
acquiring first direction information indicating the direction not specifying a device; and
causing an air conditioning device selected from the first air conditioning device and the second air conditioning device in accordance with a predetermined condition set in advance to perform processing in response to the direction, wherein the predetermined condition includes at least one of a condition of performing selection in accordance with the air state in the predetermined space.

18. A non-transitory computer readable medium configured to control a CPU to perform the method of claim 17, wherein
the CPU is configured to execute the steps of
acquiring the first direction information indicating the direction not specifying a device, and
transmitting a command that causes the air conditioning device selected from the first air conditioning device and the second air conditioning device in accordance with the predetermined condition set in advance to perform processing in response to the direction.

* * * * *